US011178176B2

(12) United States Patent
McCann et al.

(10) Patent No.: US 11,178,176 B2
(45) Date of Patent: Nov. 16, 2021

(54) METHODS AND SYSTEMS FOR DETECTION OF MAN-IN-THE-MIDDLE ATTACKS FOR SCADA COMMUNICATION NETWORKS AND APPLICATIONS OF SAME

(71) Applicant: BOARD OF TRUSTEES OF THE UNIVERSITY OF ARKANSAS, Little Rock, AR (US)

(72) Inventors: Roy McCann, Fayetteville, AR (US); Hamdi Mansour Albunashee, Fayetteville, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 114 days.

(21) Appl. No.: 16/828,006

(22) Filed: Mar. 24, 2020

(65) Prior Publication Data

US 2020/0314142 A1    Oct. 1, 2020

Related U.S. Application Data

(60) Provisional application No. 62/824,528, filed on Mar. 27, 2019.

(51) Int. Cl.
*H04L 29/06* (2006.01)
*H04L 12/26* (2006.01)

(52) U.S. Cl.
CPC ........ *H04L 63/1466* (2013.01); *H04L 43/106* (2013.01); *H04L 63/1425* (2013.01); *H04L 69/22* (2013.01)

(58) Field of Classification Search
CPC . H04L 63/1466; H04L 63/1425; H04L 69/22; H04L 43/106
See application file for complete search history.

(56) References Cited

U.S. PATENT DOCUMENTS

| 6,385,211 B1 * | 5/2002 | Williams .......... H04L 12/40013 |
| | | 370/458 |
| 9,518,839 B2 * | 12/2016 | Fansler .................... G01D 5/00 |
| 9,705,305 B2 | 7/2017 | Dolezilek et al. |
| 2009/0125158 A1 | 5/2009 | Schweitzer et al. |
| 2010/0002348 A1 | 1/2010 | Donolo et al. |
| 2014/0068711 A1 | 3/2014 | Schweitzer et al. |
| 2016/0359895 A1 * | 12/2016 | Chiu ................... H04L 63/1433 |
| 2019/0268361 A1 * | 8/2019 | Blewett .................. G06F 21/57 |

* cited by examiner

*Primary Examiner* — Vance M Little
(74) *Attorney, Agent, or Firm* — Locke Lord LLP; Tim Tingkang Xia, Esq.

(57) ABSTRACT

A system for detecting MITM for SCADA communication networks includes secure substation-substation communication links for providing secure and reliable paths to exchange OT data between substations for OT data consistency check; a SIB in each substation for sampling CT and PT measurements to calculate voltage magnitude and phase angle thereof; a S&C server in each substation coupled to the SIB for receiving the voltage magnitude and phase angle from the SIB and obtaining a packet carrying active power flow in transmission lines between two substations and a time stamp; an IDS server placed in a SCADA center for collecting the packet of each substation sent by the S&C server; analyzing the received packet from every adjacent substation; inspecting the payload of the received packet; and triggering an intrusion alarm to a SCADA operator when the power flow is not the same as the payload of the packets.

18 Claims, 13 Drawing Sheets

METHODS AND SYSTEMS FOR DETECTION OF MAN-IN-THE-MIDDLE ATTACKS FOR SCADA COMMUNICATION NETWORKS AND APPLICATIONS OF SAME

CROSS-REFERENCE TO RELATED PATENT APPLICATION

This application claims priority to and the benefit of, pursuant to 35 U.S.C. 119(e), U.S. provisional patent application Ser. No. 62/824,528, filed Mar. 27, 2019, which is incorporated herein in its entirety by reference.

STATEMENT AS TO RIGHTS UNDER FEDERALLY-SPONSORED RESEARCH

This invention was made with government support under Contract No. DE-OE0000779 awarded by the Department of Energy. The government has certain rights in the invention.

FIELD OF THE INVENTION

The invention relates generally to cybersecurity, and more particularly to a system, methodology or mechanism of detection a man-in-the-middle attack (MITM) that bypasses the traditional security layers. The invented system can detect any attempt of the MITM from injecting false data to supervisory control and data acquisition (SCADA) or OT networks.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Power grid operation and control rely heavily on the communication networks between substations and supervisory control and data acquisition (SCADA) to poll operational technology (OT) data from substations. As shown in FIG. 1, the acquired OT data are essential for power systems operation and control, specifically, for the energy management system (EMS). OT data are used in power system analytical and decision-making tools that manage functions such as optimum power flow (OPF), contingency analysis (CA), state estimation (SE), market operation (MO), automatic generation control (AGC) and economic power dispatch (EPD). All these tools are implemented inside servers reside in the EMS that their input is the real-time OT data from substations, and their output are decisions structured in form of another OT data that is sent to power plants to control bulk of power generators and substations. The availability of the communication links that transport the OT data bidirectional from substations to SCADA system is very critical for the power system and EMS operation.

Due to the long distance between substations and SCADA in the U.S., electrical companies rely on leased communication media from network service providers (NSP) such as, for example, AT&T and Version to provide communication links between SCADA and substations. NSPs use their built-in network infrastructure to connect SCADA to substations through either wire, wireless or mix of wired and wireless media, depending on substation's location. NSPs guarantee to deliver the OT packets reliably between substations and SCADA, however NSPs are usually not restricted by how many hops, routers, and miles that network traffic should go through to deliver the OT packets. This leads to concern about the security of the long-distance communication networks that carry very critical real-time OT data.

The present security remedies such as firewall, encryption, intrusion detection system (IDS) and intrusion prevention systems (IPS) are developed with a focus to secure enterprise IT (information technology) networks, and then adapted to work in a harsh environment to secure SCADA or OT network. An illustration for the security practice currently and commonly used in electric utilities is explained as follows.

Virtual Private Network (VPN): NSPs utilize their built-in infrastructure to connect SCADA network to substations network as shown in FIG. 1. In other words, NSPs do not use a dedicated physical but virtual private network (VPN) to carry OT packets or data. This will isolate the OT packets from the public network traffics. However, activating VPNs on NSP routers that are connected in a wide area network (WAN) reaches hundreds of miles, which provides an opportunity for hackers to try to access this critical infrastructure. A simple breach in the hardware or firmware of the many network devices (such as routers or switches) that are installed anywhere in this long-distance between substations and SCADA/EMS can exploit by a man-in-the-middle attack (MITM). Many incidents have been reported in news and literature proved that the power system industry, electrical utilities and EMS are vulnerable to such cyber-attacks (MITM).

Firewall and Intrusion Prevention Systems (IPS): Several cybersecurity compliances (such as NERC CIP version 5) request electrical companies to install firewalls on each substation and define electronic security perimeter(s) to manage access to bulk electrical system (BES). Such compliances control or restrict access to the network from substations and SCADA side. The common practice, a security specialist who installs firewalls, sets security rules such as source and destination IP address and port number of the allowed or secure hosts or devices in the network. Firewalls perform packet inspection to check whether the coming-in/going-out packets are matching the set security rules. If it is not, the source IP or port number of a suspicious packet will be blocked, and a notification log will be triggered. IPS is another feature could come with the firewall itself or separate hardware or software. IPS looks at different network logs and compares them from predefined attack signatures.

An OT firewall and IPS together are the common and the current best security tools that electrical companies deploy. As an example of the best commercial firewall and IPS is Check Point 1200R series, such as 1200R Next Generation Threat Prevention (NGTP) and Next Generation Firewall (NGFW). They are designed to provide threat prevention for critical infrastructure and industrial systems. To best of our knowledge, NGTP and NGFW are the best security rugged appliances designed specifically to operate under harsh environments to secure SCADA and OT equipment. It complies with industrial specifications IEEE 1613, IEC 61850-3, IEC 60068-2 for heat, vibration and immunity to electromagnetic interference (EMI). NGTP appliance includes number of security gateway software blades such as, firewall, IPsec VPN, application control, URL filtering, IPS, antivirus, Anti-Bot, etc. The other unique feature of NGTP that is not existed in the traditional firewalls/IPS, NGTP offers support for specialized SCADA and ICS protocols such as DNP3, Modbus, OPC, IEC 61850, ICCP, etc. This means that NGTP is designed specifically to operate in OT environment and inspect OT networks.

Limitations of Traditional IT and OT Security Tools: Numerous examples proved that traditional IT security tools are not robust enough to secure OT networks due to the differences in their architecture, protocols and security goals. The security goals of the IT networks are confidentiality, integrity and availability. Unlike IT networks, OT networks prioritize the security goals as availability, integrity and then confidentiality. This priority difference in the security needs and goals of the OT network than the IT networks requires the IT security devices to be designed differently. It has been noticed the IT and OT security devices do not consider the integrity of the packet's payload of the OT data, such as circuit breaker (CB) status, voltage magnitude or power demand, as much as they do regarding the packet headers. For example, NGTP and NGFW are designed specifically to support OT packets, however the payload content (such as the measured value or power flow or bus voltage) is still not considered in these advanced security appliances.

Current SCADA protocols, such as DNP3 or IEC 61850, which are either built on the top of the TCP/IP layers or structured by a vendor, include a number of layers carry OT packet headers and payload as shown in FIG. 2. Only the packet headers (such as IP address and port number) are considered in IT/OT network security devices (such as NGTP and NGFW). However, the interpretation of the digital or analog value inside the packet payload (such as CB status, voltage value, current value, and power flow value) is not considered. With these limitations, a MITM can launch false data injection attacks that fool network security devices with a false packet payload. For example, if a MITM is inserted between a substation and SCADA communication, and MITM responds to a SCADA request of a circuit breaker (CB) status with the same packet headers but different payload (for example, a wrong CB status), NGTP and NGFW will not detect it. Another example would be that MITM reports wrong measurement values of voltage, current or power flow to SCADA using the expected headers of the OT packets.

Therefore, there is a need to build new security systems and mechanisms that are different from the traditional (information technology) IT security tools.

SUMMARY OF THE INVENTION

One of the objectives of the invention is to provide novel security systems and mechanisms that are different from the traditional information technology (IT) security tools and solve the shortcomings of the traditional IT security tools. The OT security systems should be aware not only the OT packet headers but also its payload. To do so, the OT security systems or devices should consider the knowledge of the physics of the power systems operation and the operational data constraints. This knowledge will make the security devices aware of the "cyber" and "physical" system status throughout the entire content of the OT packet.

The increasing use of digital networks and computer-based control of electric power delivery systems brings benefits of efficiency, resiliency and increased availability of renewable energy sources. However, the adoption of "smart grid" enabling technologies also creates cybersecurity threats to the operation of critical energy infrastructure. This invention discloses a method where independent verification of power system protection data can be achieved that leverages existing installed technologies that provide a new and effective technique to detect and eliminate the threat of man-in-the-middle attacks (MITMs). This achieves higher levels of power system security with minimal increase in cost.

In one aspect, the invention relates to a system for detecting man-in-the-middle attacks for supervisory control and data acquisition (SCADA) communication networks. In one embodiment, the system includes at least one secure substation-substation communication link for providing a secure and reliable path to exchange operational information (OT) data between substations for consistency checking of the OT data in SCADA.

The system also includes at least one substation intelligent box (SIB) placed inside each substation and coupled to a main substation bus for sampling current transformer (CT) and potential transformer (PT) measurements to calculate voltage magnitude (V) and phase angle ($\delta$) thereof.

In addition, the system further includes at least one send and capture (S&C) server placed inside each substation and coupled through communication means to the SIB for receiving the voltage magnitude and phase angle from the SIB and obtaining a packet that carries active power flow in transmission lines between two substations and a time stamp, based on an output from the SIB for each substation.

Furthermore, the system includes at least one intrusion detection system (IDS) server placed in a SCADA center for collecting the packet of each substation sent by the S&C server; analyzing the received packet from every adjacent substation; inspecting the payload of the received packet; and triggering an intrusion alarm to a SCADA operator when the payload of the packets indicates the power flow is not the same.

In one embodiment, the at least one secure substation-substation communication link is one or more teleprotection communication links.

In one embodiment, the at least one SIB comprises at least one processor operably coupled to a scaled level of the CT and the PT of the main substation bus, and configured to sample the CT and PT measurements to calculate the voltage magnitude (V) and phase angle ($\delta$).

In one embodiment, each SIB inside a substation is in synch with the other SIB placed inside its adjacent substation.

In one embodiment, the communication means comprises a serial communication network, or other communication networks.

In one embodiment, the at least one S&C server at each substation (substation A) is configured to perform the following functions:

(a) tagging the calculated voltage magnitude ($V_A$) and phase angle ($\delta_A$) at substation A with a timestamp $t_A$;

(b) creating a packet $Pkt_A$ that carries the value of $V_A$, $\delta_A$ and $t_A$;

(c) sending the packet $Pkt_A$ to the at least one C&S server installed in its adjacent substation, substation B;

(d) receiving and capturing a packet $Pkt_B$, which is a packet transmitted from the at least one C&S server installed in substation B;

(e) calculating the active power flow ($P_{AB}$) between substation A and substation B using the following two equations, $$P_{AB} = \frac{|V_A|^2}{|Z_{AB}|} \cos(\emptyset_{Z_{AB}}) - \frac{|V_A||V_B|}{|Z_{AB}|} \cos(\emptyset_{Z_{AB}} + S_A - S_B) \quad (1)$$

$$P_{BA} = \frac{|V_B|^2}{|Z_{AB}|} \cos(\emptyset_{Z_{AB}}) - \frac{|V_A||V_B|}{|Z_{AB}|} \cos(\emptyset_{Z_{AB}} + S_B - S_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $S_A$ and $S_B$ are the phase angle at bus A and B, respectively; and $|Z_{AB}|$ and $\emptyset_{Z_{AB}}$ are the magnitude and phase angle of the transmission line impedance between bus A and B;

(f) tagging the calculated $P_{AB}$ and $P_{BA}$ with a timestamp $t_4$;

(g) creating a packet Pkt_SubA that carries $N_{AB}$, or $N_{BA}$, or other variables if more data integrity verifications are needed, and $t_4$; and (h) sending the packet Pkt_SubA to the at least one IDS server, Meanwhile, the at least one C&S server installed in the adjacent substation (substation B) of said each substation (substation A) is configured to perform the same steps (a)-(h), and send the packet $Pkt_B$ to the at least one C&S server installed substation A, and the packet Pkt_SubB packet to the at least one IDS server.

In one embodiment, the at least one IDS server is either a physical or virtual server placed in the SCADA center that is on the same SCADA network of substations.

In one embodiment, the at least one IDS server is configured to perform the following functions to detect an intrusion:

(a) collecting all the sent packets by substations;

(b) analyzing the received packet Pkt_SubA and Pkt_SubB from every adjacent substations (example Substation A and B);

(c) inspecting the payload of the received packets Pkt_SubA and Pkt_SubB; and (d) when the payload of the packets Pkt_SubA and Pkt_SubB indicates the power flow $P_{AB}$ in both the packets are not the same (or are not the same but with allowable tolerance), the at least one IDS server triggers an intrusion alarm to a SCADA operator.

In another aspect, the invention relates to a method for detecting an MITM for SCADA communication networks. In one embodiment, the method includes providing a secure and reliable path to exchange operational information (OT) data between substations for consistency checking of OT data in SCADA; sampling current transformer (CT) and potential transformer (PT) measurements to calculate voltage magnitude (V) and phase angle ($S$) of each substation, by at least one substation intelligent box (SIB) placed inside each substation and coupled to a main substation bus; receiving the calculated voltage magnitude and phase angle of each substation; and obtaining a packet that carries the active/reactive power flow between two adjacent substations and a time stamp, based on the received voltage magnitude and phase angle for each substation, by at least one send and capture (S&C) server placed inside each substation and coupled through communication means to the SIB; and collecting the packet of each substation; analyzing the received packet from every adjacent substation; inspecting the payload of the received packet; and triggering an intrusion alarm to a SCADA operator when the payload of the packets indicates the power flow is not the same, by at least one intrusion detection system (IDS) server placed in a SCADA center.

In one embodiment, the secure and reliable path comprises at least one secure substation-substation communication link including one or more teleprotection communication links.

In one embodiment, the at least one SIB comprises at least one processor operably coupled to a scaled level of the CT and the PT of the main substation bus.

In one embodiment, each SIB inside a substation is in synch with the other SIB placed inside its adjacent substation.

In one embodiment, the receiving and obtaining step comprises:

(a) tagging the calculated voltage magnitude ($V_A$) and phase angle ($S_A$) at substation A with a timestamp $t_4$;

(b) creating a packet $Pkt_A$ that carries the value of $V_A$, $S_A$ and $t_4$;

(c) sending the packet $Pkt_A$ to the at least one C&S server installed in its adjacent substation, substation B;

(d) receiving and capturing a packet $Pkt_B$, which is a packet transmitted from the at least one C&S server installed in substation B;

(e) calculating the active power flow ($P_{AB}$) between substation A and substation B using the following two equations, $$P_{AB} = \frac{|V_A|^2}{|Z_{AB}|} \cos(\emptyset_{Z_{AB}}) - \frac{|V_A||V_B|}{|Z_{AB}|} \cos(\emptyset_{Z_{AB}} + S_A - S_B) \quad (1)$$

$$P_{BA} = \frac{|V_B|^2}{|Z_{AB}|} \cos(\emptyset_{Z_{AB}}) - \frac{|V_A||V_B|}{|Z_{AB}|} \cos(\emptyset_{Z_{AB}} + S_B - S_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $S_A$ and $S_B$ are the phase angle at bus A and B, respectively; and $|Z_{AB}|$ and $\emptyset_{Z_{AB}}$ are the magnitude and phase angle of the transmission line impedance between bus A and B;

(f) tagging the calculated $P_{AB}$ and $P_{BA}$ with a timestamp $t_4$;

(g) creating a packet Pkt_SubA that carries $N_{AB}$, or $N_{BA}$, or other variables if more data integrity verifications are needed, and $t_4$; and (h) sending the packet Pkt_SubA to the at least one IDS server, In addition, the same steps (a)-(h) are performed at an adjacent substation B of substation A by the at least one C&S server installed substation B, and sending the packet $Pkt_B$ to the at least one C&S server installed substation A, and the packet Pkt_SubB packet to the at least one IDS server.

In one embodiment, at least one IDS server is either a physical or virtual server placed in the SCADA center that is on the same SCADA network of substations.

In one embodiment, the collecting, analyzing, inspecting and triggering step comprises
(a) collecting all the sent packets by substations;
(b) analyzing the received packet Pkt_SubA and Pkt_SubB from every adjacent sub station;
(c) inspecting the payload of the received packets Pkt_SubA and Pkt_SubB; and
(d) when the payload of the packets Pkt_SubA and Pkt_SubB indicates the power flow $P_{AB}$ in both the packets are not the same, the at least one IDS server triggers an intrusion alarm to a SCADA operator.

In a further aspect, the invention relates to a non-transitory computer-readable medium storing programs or codes which, when executed by one or more processors, cause a system to perform the above method for detecting an MITM for SCADA communication networks.

According to the invention, the system and method provide a fast and reliable method for detecting man-in-the-middle attacks with minimal additional hardware. The advantage is increased security at a lower cost compared to competing methods. The invention can be applied to detect man-in-the-middle attacks for most electric power delivery systems, which include all existing transmission (>100 kV) and distribution (<100 kV) utility systems.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
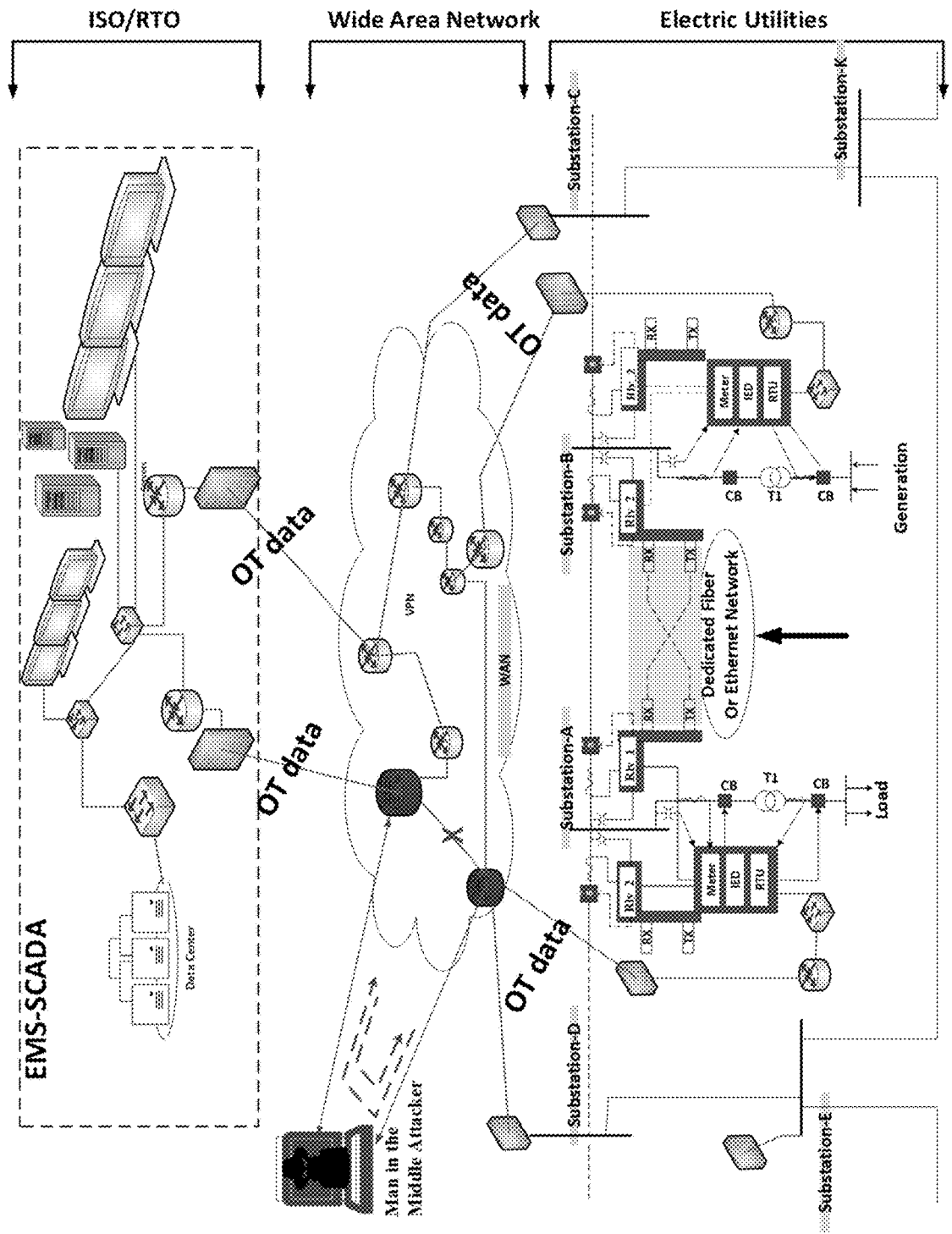
FIG. 1 shows schematically a SCADA Network infrastructure for power system operation.
Figure 2:
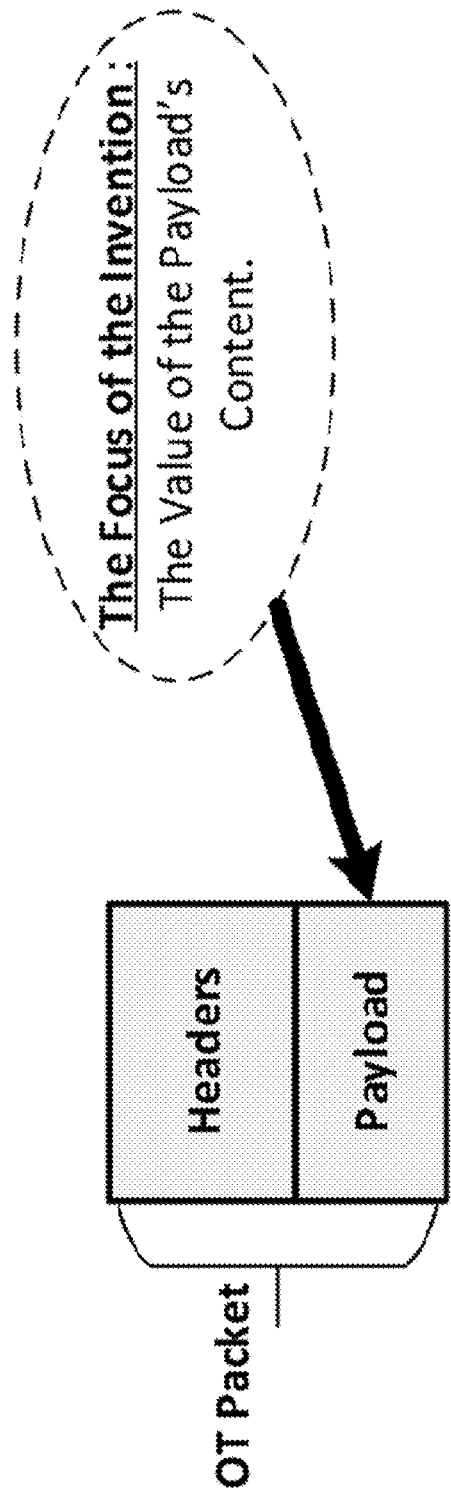
FIG. 2: shows schematically an OT packet's structure.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/ or" includes any and all combinations of one or more of the associated listed items.

As used herein, the term module may refer to, be part of, or include an Application Specific Integrated Circuit (ASIC); an electronic circuit; a combinational logic circuit; a field-programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and maybe a uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in a different order (or concurrently) without altering the principles of the invention.

The increasing use of digital networks and computer-based control of electric power delivery systems brings benefits of efficiency, resiliency and increased availability of renewable energy sources. However, the adoption of "smart grid" enabling technologies also creates cybersecurity threats to the operation of critical energy infrastructure. This invention in one aspect discloses a method where independent verification of power system protection data can be achieved that leverages existing installed technologies that provide a new and effective technique to detect and eliminate the threat of man-in-the-middle attacks (MITMs). This achieves higher levels of power system security with minimal increase in cost.

The invention provides a fast and reliable method for detecting man-in-the-middle attacks with minimal additional hardware. The advantage is increased security at lower cost compared to competing methods. The invention can be applied to detect man-in-the-middle attacks for most electric power delivery systems. This includes all existing transmission (>100 kV) and distribution (<100 kV) utility systems.

In one aspect, the invention relates to a system for detecting man-in-the-middle attacks for supervisory control and data acquisition (SCADA) communication networks. In one embodiment, the system includes at least one secure substation-substation communication link for providing a secure and reliable path to exchange operational information (OT) data between substations for consistency checking of the OT data in SCADA.

The system also includes at least one substation intelligent box (SIB) placed inside each substation and coupled to a main substation bus for sampling current transformer (CT) and potential transformer (PT) measurements to calculate voltage magnitude (V) and phase angle ($\mathcal{S}$) thereof.

In addition, the system further includes at least one send and capture (S&C) server placed inside each substation and coupled through communication means to the SIB for receiving the voltage magnitude and phase angle from the SIB and obtaining a packet that carries active power flow in transmission lines between two substations and a time stamp, based on an output from the SIB for each substation.

Furthermore, the system includes at least one intrusion detection system (IDS) server placed in a SCADA center for collecting the packet of each substation sent by the S&C server; analyzing the received packet from every adjacent substation; inspecting the payload of the received packet; and triggering an intrusion alarm to a SCADA operator when the payload of the packets indicates the power flow is not the same.

In one embodiment, the at least one secure substation-substation communication link is one or more teleprotection communication links.

In one embodiment, the at least one SIB comprises at least one processor operably coupled to a scaled level of the CT and the PT of the main substation bus, and configured to sample the CT and PT measurements to calculate the voltage magnitude (V) and phase angle ($\mathcal{S}$).

In one embodiment, each SIB inside a substation is in synch with the other SIB placed inside its adjacent substation.

In one embodiment, the communication means comprises a serial communication network, or other communication networks.

In one embodiment, the at least one S&C server at each substation (substation A) is configured to perform the following functions:

(a) tagging the calculated voltage magnitude ($V_A$) and phase angle ($\mathcal{S}_A$) at substation A with a timestamp $t_A$;

(b) creating a packet $Pkt_A$ that carries the value of $V_A$, $\mathcal{S}_A$ and $t_A$;

(c) sending the packet $Pkt_A$ to the at least one C&S server installed in its adjacent substation, substation B;

(d) receiving and capturing a packet $Pkt_B$, which is a packet transmitted from the at least one C&S server installed in substation B;

(e) calculating the active power flow ($P_{AB}$) between substation A and substation B using the following two equations, $$P_{AB} = \frac{|V_A|^2}{|Z_{AB}|} \cos(\phi_{Z_{AB}}) - \frac{|V_A||V_B|}{|Z_{AB}|} \cos(\phi_{Z_{AB}} + S_A - S_B) \quad (1)$$

$$P_{BA} = \frac{|V_B|^2}{|Z_{AB}|} \cos(\phi_{Z_{AB}}) - \frac{|V_A||V_B|}{|Z_{AB}|} \cos(\phi_{Z_{AB}} + S_B - S_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $\mathcal{S}_A$ and $\mathcal{S}_B$ are the phase angle at bus A and B, respectively; and $|Z_{AB}|$ and $\emptyset_{Z_{AB}}$ are the magnitude and phase angle of the transmission line impedance between bus A and B;

(f) tagging the calculated $P_{AB}$ and $P_{BA}$ with a timestamp $t_A$;

(g) creating a packet Pkt_SubA that carries $N_{AB}$, or $N_{BA}$, or other variables if more data integrity verification are needed, and $t_A$; and (h) sending the packet Pkt_SubA to the at least one IDS server, Meanwhile, the at least one C&S server installed in the adjacent substation (substation B) of said each substation (substation A) is configured to perform the same steps (a)-(h), and send the packet $Pkt_B$ to the at least one C&S server installed substation A, and the packet Pkt_SubB packet to the at least one IDS server.

In one embodiment, the at least one IDS server is either a physical or virtual server placed in the SCADA center that is on the same SCADA network of substations.

In one embodiment, the at least one IDS server is configured to perform the following functions to detect an intrusion:
(a) collecting all the sent packets by substations;
(b) analyzing the received packet Pkt_SubA and Pkt_SubB from every adjacent substation (for example, Substation A and B);
(c) inspecting the payload of the received packets Pkt_SubA and Pkt_SubB; and
(d) when the payload of the packets Pkt_SubA and Pkt_SubB indicates the power flow $P_{AB}$ in both the packets are not the same, the at least one IDS server triggers an intrusion alarm to a SCADA operator.

In another aspect, the invention relates to a method for detecting an MITM for SCADA communication networks. In one embodiment, the method includes providing a secure and reliable path to exchange operational information (OT) data between substations for consistency checking of OT data in SCADA; sampling CT and PT measurements to calculate voltage magnitude (V) and phase angle ($\mathcal{S}$) of each substation, by at least one SIB placed inside each substation and coupled to a main substation bus; receiving the calculated voltage magnitude and phase angle of each substation; and obtaining a packet that carries the active/reactive power flow between two adjacent substations and a timestamp, based on the received voltage magnitude and phase angle for each substation, by at least one S&C server placed inside each substation and coupled through communication means to the SIB; and collecting the packet of each substation; analyzing the received packet from every adjacent substation; inspecting the payload of the received packet; and triggering an intrusion alarm to a SCADA operator when the payload of the packets indicates the power flow is not the same, by at least one IDS server placed in a SCADA center.

In one embodiment, the secure and reliable path comprises at least one secure substation-substation communication link including one or more teleprotection communication links.

In one embodiment, the at least one SIB comprises at least one processor operably coupled to a scaled level of the CT and the PT of the main substation bus.

In one embodiment, each SIB inside a substation is in synch with the other SIB placed inside its adjacent substation.

In one embodiment, the receiving and obtaining step comprises:
(a) tagging the calculated voltage magnitude ($V_A$) and phase angle ($\mathcal{S}_A$) at substation A with a timestamp $t_A$;
(b) creating a packet $Pkt_A$ that carries the value of $V_A$, $\mathcal{S}_A$ and $t_A$;
(c) sending the packet $Pkt_A$ to the at least one C&S server installed in its adjacent substation, substation B;
(d) receiving and capturing a packet $Pkt_B$, which is a packet transmitted from the at least one C&S server installed in substation B;
(e) calculating the active power flow ($P_{AB}$) between substation A and substation B using the following two equations, $$P_{AB} = \frac{|V_A|^2}{|Z_{AB}|}\cos(\emptyset_{Z_{AB}}) - \frac{|V_A||V_B|}{|Z_{AB}|}\cos(\emptyset_{Z_{AB}} + \mathcal{S}_A - \mathcal{S}_B)$$

-continued
$$P_{BA} = \frac{|V_B|^2}{|Z_{AB}|}\cos(\emptyset_{Z_{AB}}) - \frac{|V_A||V_B|}{|Z_{AB}|}\cos(\emptyset_{Z_{AB}} + \mathcal{S}_B - \mathcal{S}_A)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $\mathcal{S}_A$ and $\mathcal{S}_B$ are the phase angle at bus A and B, respectively; and $|Z_{AB}|$ and $\emptyset_{Z_{AB}}$ are the magnitude and phase angle of the transmission line impedance between bus A and B;
(f) tagging the calculated $P_{AB}$ and $P_{BA}$ with a timestamp $t_A$;
(g) creating a packet Pkt_SubA that carries $N_{AB}$, or $N_{BA}$, or other variables if more data integrity verifications are needed, and $t_A$; and
(h) sending the packet Pkt_SubA to the at least one IDS server, In addition, the same steps (a)-(h) are performed at an adjacent substation B of substation A by the at least one C&S server installed substation B, and sending the packet $Pkt_B$ to the at least one C&S server installed substation A, and the packet Pkt_SubB packet to the at least one IDS server.

In one embodiment, the at least one IDS server is either a physical or virtual server placed in the SCADA center that is on the same SCADA network of substations.

In one embodiment, the collecting, analyzing, inspecting and triggering step comprises
(a) collecting all the sent packets by substations;
(b) analyzing the received packet Pkt_SubA and Pkt_SubB from every adjacent substation (example, Substation A and B;
(c) inspecting the payload of the received packets Pkt_SubA and Pkt_SubB; and
(d) when the payload of the packets Pkt_SubA and Pkt_SubB indicates the power flow $P_{AB}$ in both the packets is not the same, the at least one IDS server triggers an intrusion alarm to a SCADA operator.

It should be noted that all or a part of the steps according to the embodiments of the present invention is implemented by hardware or a program instructing relevant hardware. Yet another aspect of the invention provides a non-transitory computer-readable medium storing programs or codes which, when executed by one or more processors, cause a system to perform the above method for detecting an MITM for SCADA communication networks. The computer executable instructions or program codes enable a computer or a similar computing system to complete various operations in the above disclosed method for privilege management. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

Without intending to limit the scope of the invention, further exemplary implementations of the present invention according to the embodiments of the present invention are given below in view of drawings. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Figure 3:
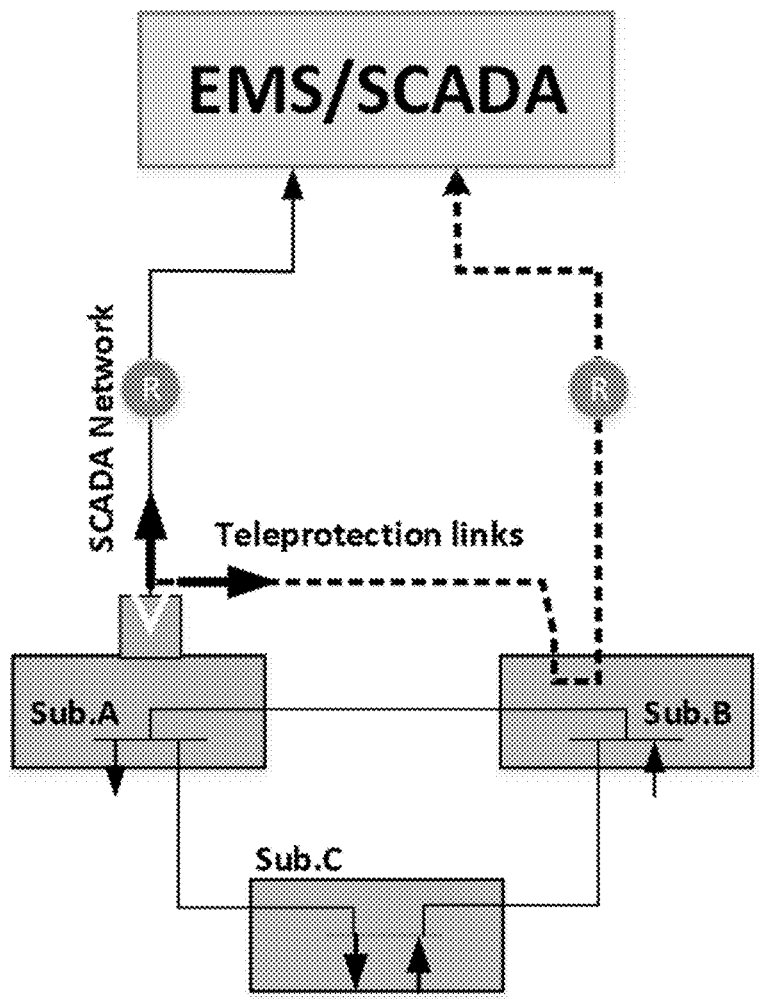
FIG. 3 demonstrates schematically the two paths of OT data to be delivered from substations to SCADA for consistency checking of the OT data, according to one embodiment of the invention.
Figure 4:
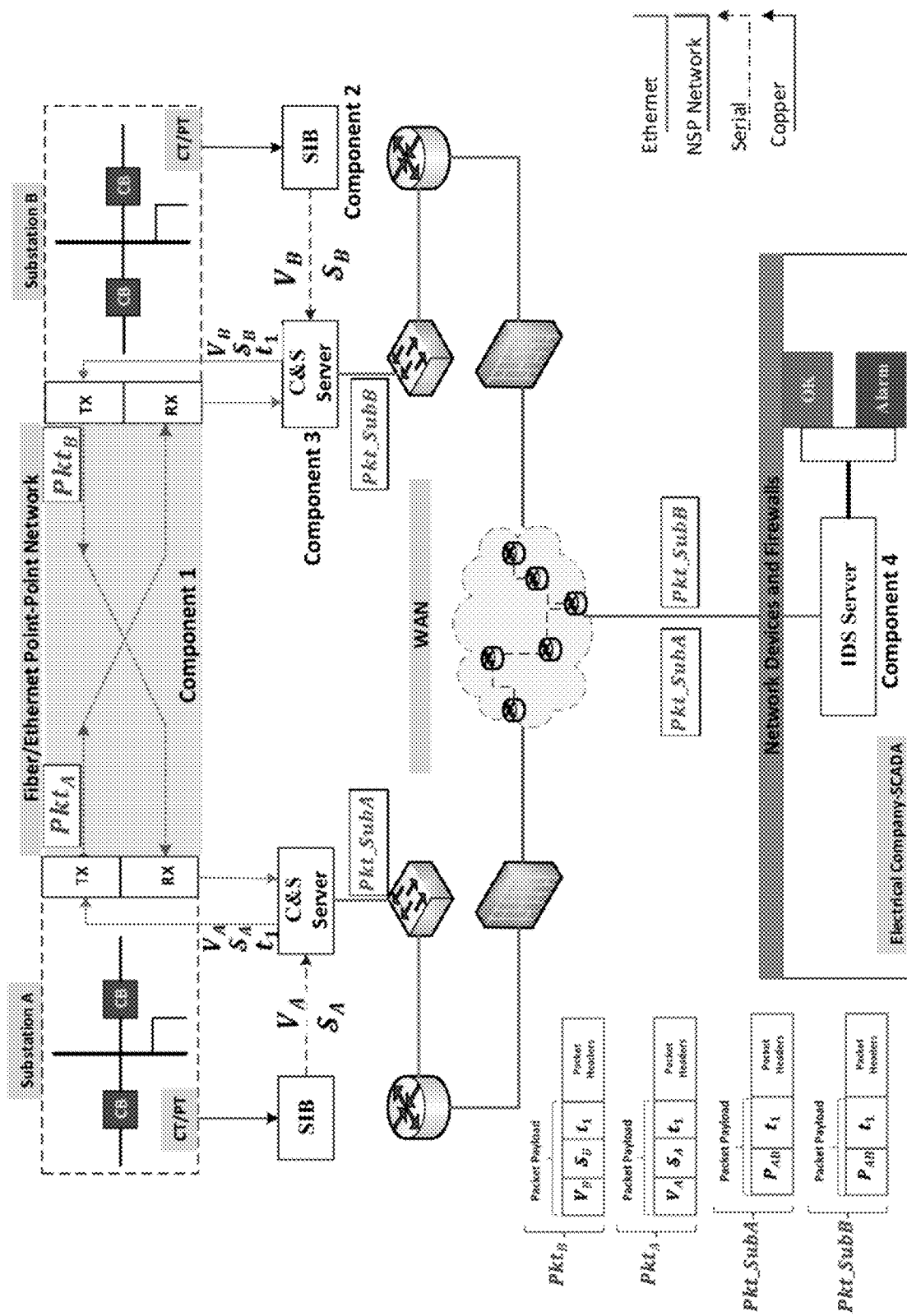
FIG. 4 shows schematically a detection system component, according to one embodiment of the invention.

As shown in FIG. 3, while each substation sends its OT data to the SCADA/EMS, each substation exchange some of the OT data through the teleprotection network with an adjacent substation. In other words, the OT data have two paths to be delivered from substations to SCADA as follows; 1) a substation-SCADA path, and 2) a substation-substation-SCADA path. The detection system leverages these two paths to provide an independent consistency checking and verification on OT data to detect MITM attack inserted in one of these paths. In one aspect of the invention, the detection system includes, among other things, components: secure substation-substation communication links, a substation intelligent box (SIB), a send and capture (S&C) server, and an intrusion detection system (IDS) server, which may be existed or installed and then used in each substation and SCADA/EMS system. These components are shown in FIG. 4 and discussed below.

Secure Substation-Substation Communication Links—Component 1

The detection system leverages secure communication links (highlighted in FIG. 4) that are already existed between substations (for protection purposes) to exchange and forward some of the operational information (OT) data for security and detection purposes. Using these teleprotection links, the OT data are exchanged and then forwarded to the other components of the detection system to detect any MITM activity. In certain embodiments, the detection system uses the existed communication links between substations to provide a secure and reliable path to exchange OT data between substations for consistency checking of OT data in SCADA/EMS. The exchanged OT data is then used by Components 2, 3 and 4 to detect a MITM attack that is used in the invented detection scheme. These communication links are briefly described below and shown in FIG. 4.

Figure 5:
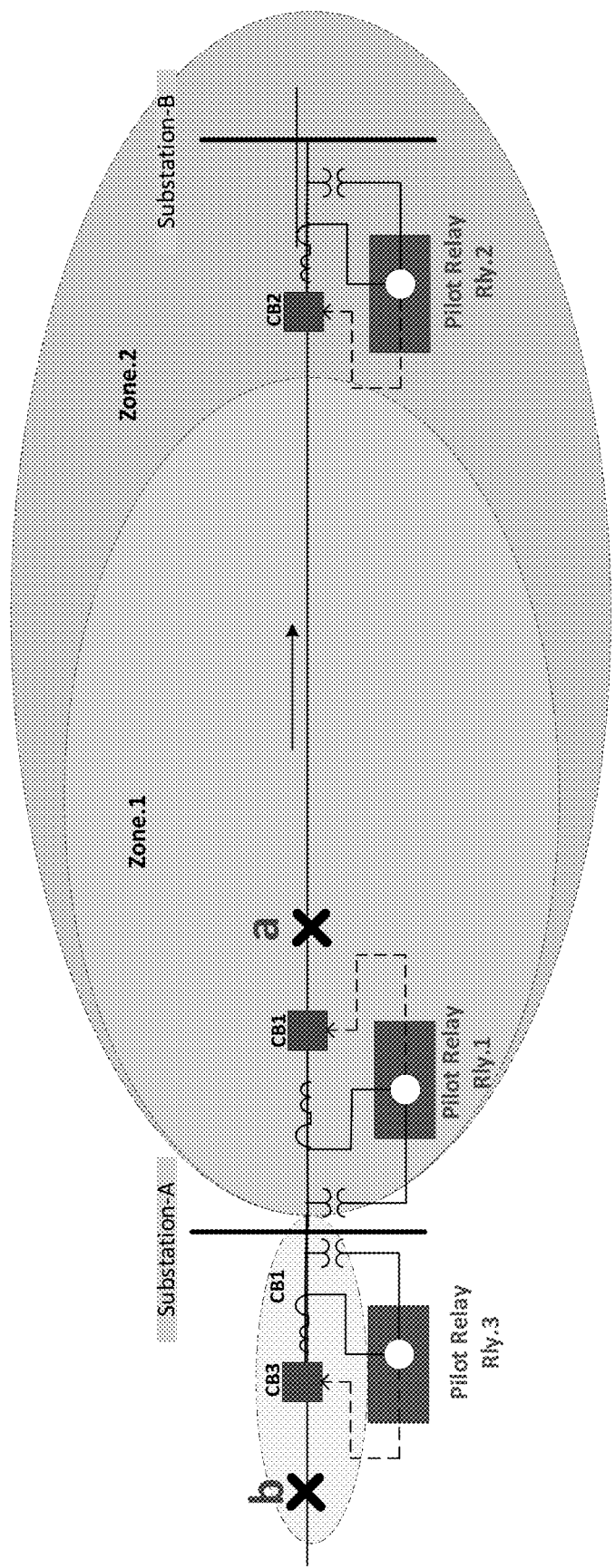
FIG. 5 shows schematically a transmission line protection scheme without teleprotection communication links, according to one embodiment of the invention.

Teleprotection Communication Links: Transmission lines between substations are susceptible to fault and overcurrent events. Protective relays with circuit breakers (CB) are used to interrupt power flow through transmission lines in case of fault or overcurrent event (as an example). The protection scheme shown in FIG. 5 is expected to operate without the help of the teleprotection communication links. When a fault happens in Zone.1 at point a, the protective relay (Rly.1) will sense the overcurrent and send a signal to trip CB1 instantaneously. The protective relay (Rly.2) will sense the overcurrent and send a command to trip CB2 after 20 cycles. Rly.2 takes 20 cycles (time delay) to trip CB2 because Rly.2 cannot identify the accurate location of the fault which could be located at point b where it is protected by Rly.3. If that is true, the period of 20 cycles is sufficient for Rly.3 to trip CB3 and clear the fault.

Figure 6:
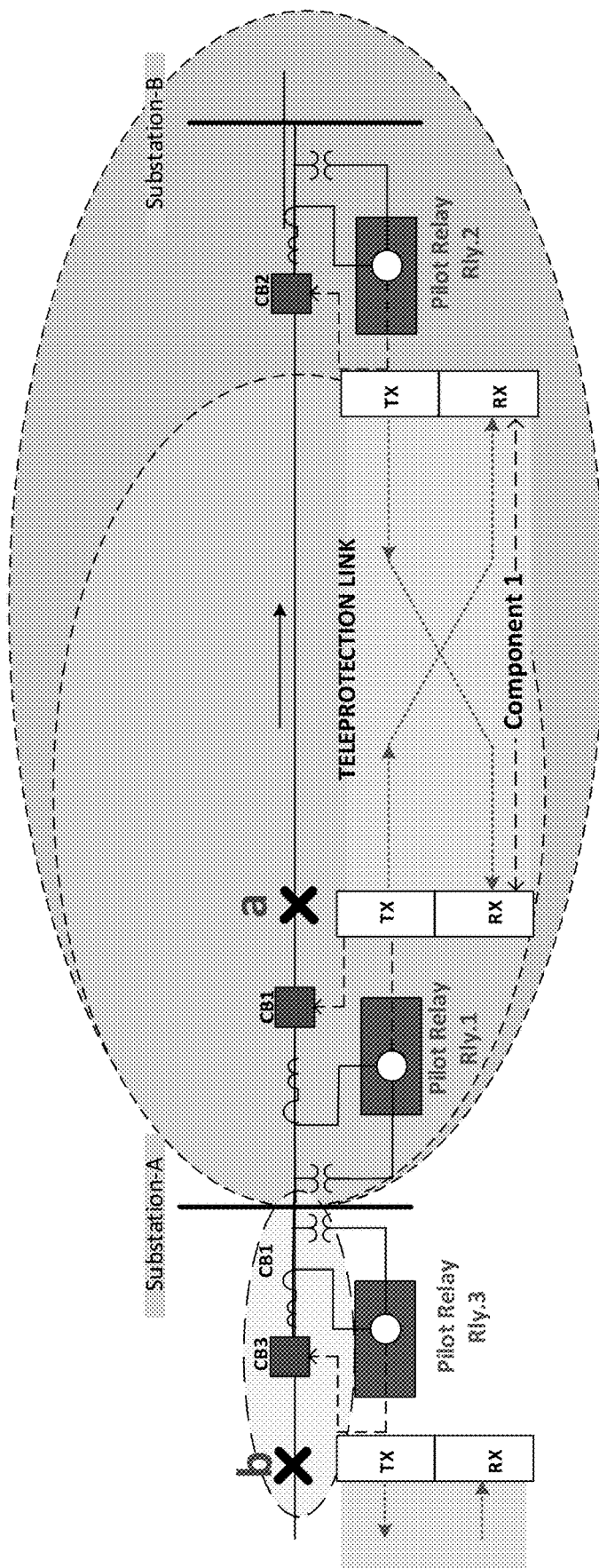
FIG. 6 shows schematically a transmission line protection scheme assisted with teleprotection communication links (Component-1), according to one embodiment of the invention.

FIG. 6 demonstrates the teleprotection communication link implemented in the above protection scheme shown in FIG. 5 assisted with communication links. For example, if a fault happens in Zone.1 at point a, both CB1 and CB2 will trip instantaneously because the relays (Rly.1 and Rly.2) will communicate to share the fault location.

With the teleprotection communication links, Rly.1 will send the fault event as a packet to Rly.2 telling the location of the fault is point a, and accordingly, Rly.2 will instantaneously trip CB2. This protection scheme is called permissive under-reaching transfer trip (PUTT). PUTT makes CB2 trips in 3 cycles instead of 20 cycles, i.e., it saves 17 cycles.

Security and Reliability of Teleprotection Communication Links: The teleprotection communication links use different technologies such as power line carrier, synchronous optical network (SONET) multiplexer, and Ethernet switches. The used media is either leased lines, microwaves, fiber optics. The two most used technologies are SONET and Ethernet using a dedicated point to point fiber or Ethernet media. The teleprotection communication links are expected to be secure, reliable and dependable to guarantee reliable communication and protection services between substations. The communication network assists the pilot relays in exchanging event data (such as the fault location) an average of 4 ms whenever a fault is sensed by one of the relays.

Substation Intelligent Box (SIB)—Component 2

In certain embodiments, the SIB box is placed inside each substation as shown in FIG. 4. Inside this box is a processor (such as, but is not limited, a digital signal processor (DSP) microcontroller, TMS20F2835) that is connected to a scaled level of the current transformer (CT)/potential transformer (PT) of the main substation bus. The DSP samples the CT and PT measurements to calculate the voltage magnitude (V) and phase angle ($\delta$). Each SIB inside a substation is in synch with the other SIB placed inside the adjacent substation. The output of the SIB box which is (V) and ($\delta$) are send to Component 3 through a serial communication network (FIG. 4), or other means of the communication network.

Capture and Send Server (C&S Server)—Component 3

In certain embodiments, the C&S server is placed inside each substation and is connected through serial communication with the SIB as shown in FIG. 4. In certain embodiments, the C&S server at each substation, (e.g., Substation A) performs the following functions:

(a) Tags the calculated voltage magnitude ($V_A$) and phase angle ($\delta_A$) at Substation A with a timestamp $t_A$.

(b) Creates $Pkt_A$, which is a lightweight packet that carries the value of $V_A$, $\delta_A$ and $t_A$ (c) Sends the $Pkt_A$ to the C&S Server installed in the adjacent substation, Substation B.

(d) Receives and captures $Pkt_B$, which is the packet transmitted from the C&S server placed in Substation B.

(e) Calculates the active power flow ($P_{AB}$) between Substation A and Substation B using the following two equations $$P_{AB} = \frac{|V_A|^2}{|Z_{AB}|} \cos(\phi_{Z_{AB}}) - \frac{|V_A||V_B|}{|Z_{AB}|} \cos(\phi_{Z_{AB}} + \delta_A - \delta_B) \quad (1)$$

$$P_{BA} = \frac{|V_B|^2}{|Z_{AB}|} \cos(\phi_{Z_{AB}}) - \frac{|V_A||V_B|}{|Z_{AB}|} \cos(\phi_{Z_{AB}} + \delta_B - \delta_A) \quad (2)$$

where $P_{AB}$ is the active power flow in the transmission line from bus A and B. $P_{BA}$ is the active power flow in the transmission line from bus B and A. $V_A$ and $V_B$ are the voltage magnitude at bus A and B, respectively. $\delta_A$ and $\delta_B$ are the phase angle at bus A and B, respectively. $|Z_{AB}|$ and $\phi_{Z_{AB}}$ are the magnitude and phase angle of the transmission line impedance between bus A and B.

(f) Tags the calculated $P_{AB}$ and $P_{BA}$ with a timestamp ($t_A$).

(g) Creates Pkt_SubA, which is a lightweight packet that carries the value $P_{AB}$ (or $P_{BA}$ or other variables if more data integrity verifications are needed) and $t_A$.

(h) Sends Pkt_SubA packet to Component 4, IDS Server.

The C&S Server installed in Substation B will perform the same steps (a)-(h) and send two packets; $Pkt_B$ to the C&S Server installed Substation A, and Pkt_SubB packet to Component 4 as shown in FIG. 4.

IDS Server—Component 4

The IDS server can be either a physical or virtual server placed in a SCADA center. It is on the same network of Substations—SCADA network. In certain embodiments, the server performs the following tasks to detect an intrusion.

(a) It collects all the sent packets by substations.
(b) It analyzes the received packet from every adjacent substation. For example, it analyzes Pkt_SubA and Pkt_SubB from Substation A and Substation B as shown in in FIG. 4.
(c) It inspects the payload of the received packet, Pkt_SubA and Pkt_SubB.
(d) If the payload of the packets indicates the power flow $P_{AB}$ is not the same, the IDS server will trigger an intrusion alarm to SCADA operator.

Figure 7:
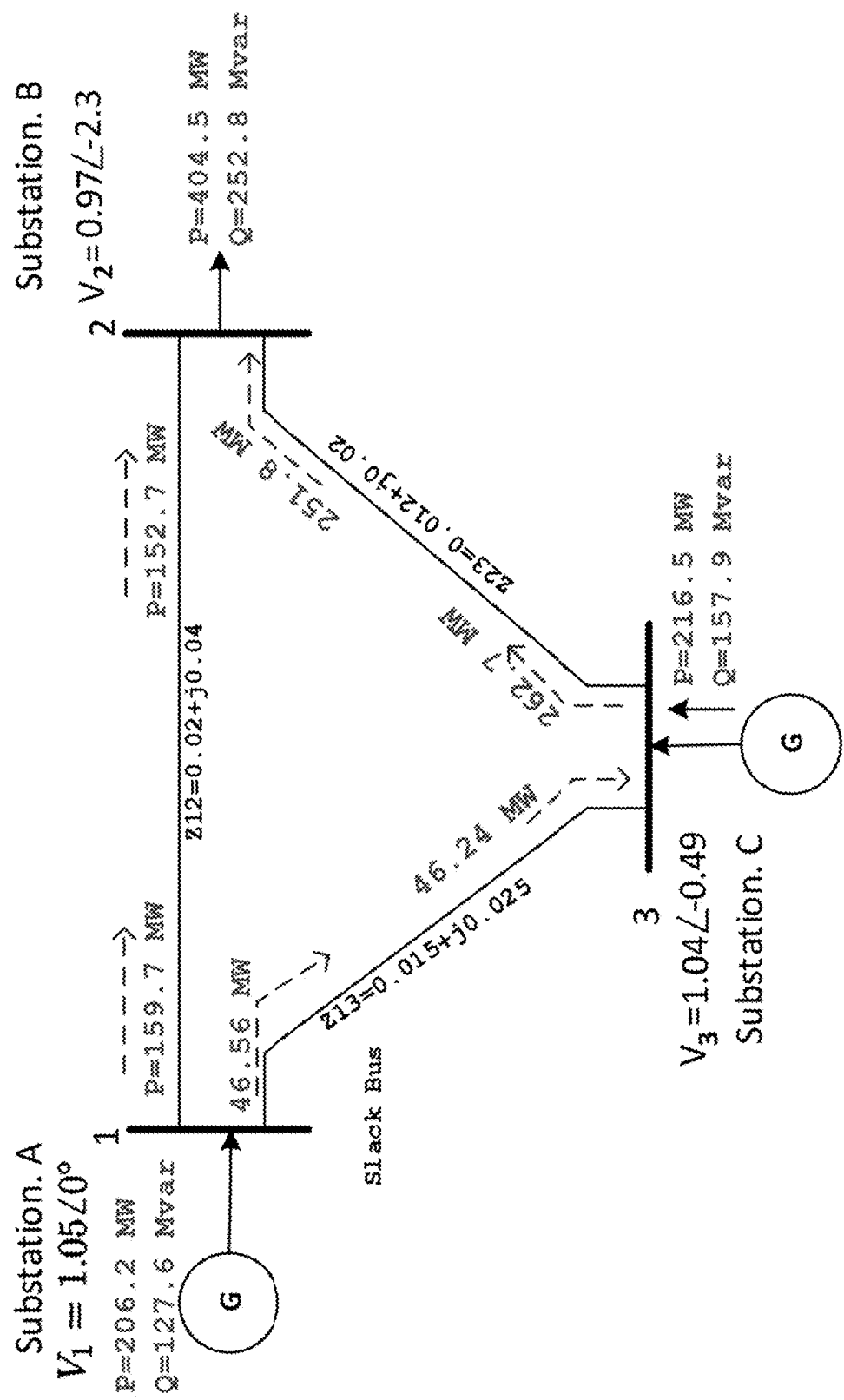
FIG. 7 shows schematically a single line diagram for a three-bus system, according to one embodiment of the invention.

In one embodiment, a three-bus system is used to validate the detection system. FIG. 7 shows the one-line diagram of the three-bus system. Transmission line impedance data are given in per unit and marked on the diagram. The system's susceptances are neglected. The injected power, load, the power flow in each transmission along with the voltage magnitude and phase angles are marked on the diagram shown FIG. 7.

Figure 8:
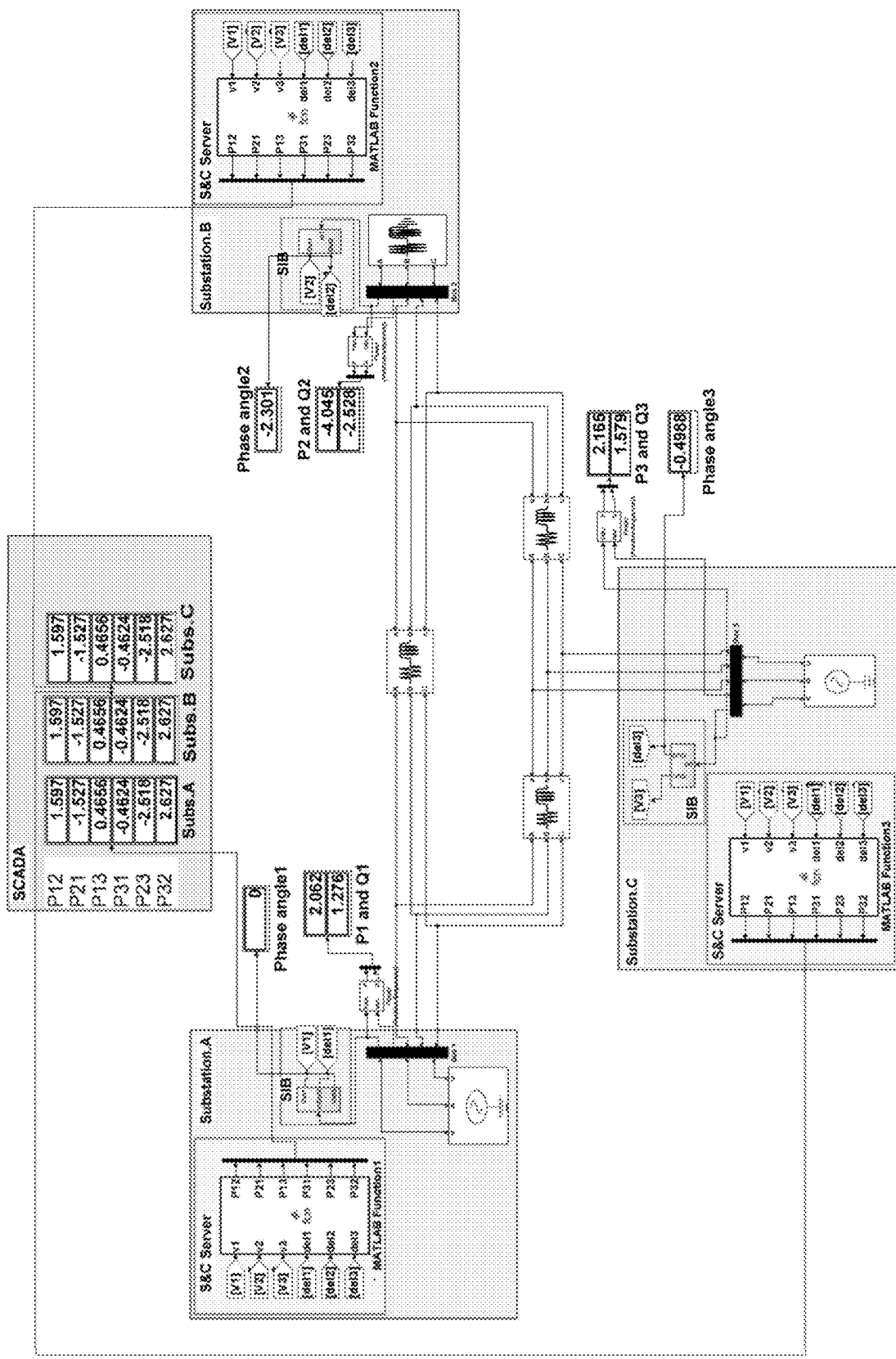
FIG. 8 shows schematically Matlab® Simulink for the three-bus system, according to one embodiment of the invention.

The three-bus power system shown in FIG. 7 is simulated in Matlab®-Simulink as shown FIG. 8. Also, the four components of the detection system are simulated as described in the previous sections as follows:

1) SIB, S&C Server and IDS Server are simulated in Matlab® as shown in FIG. 8.
2) A Matlab® function is built to calculate the power flow in each substation. This function mimics the operation of the S&C Server component.
3) The calculated power flow values by each substation are sent to SCADA as shown in FIG. 8.
4) IDS Server is emulated to accomplish its function—comparing the received power flow values from S&C Server in each substation.

Numbers of scenarios are considered to validate the detection system according to the embodiments of the invention.

Figure 9:
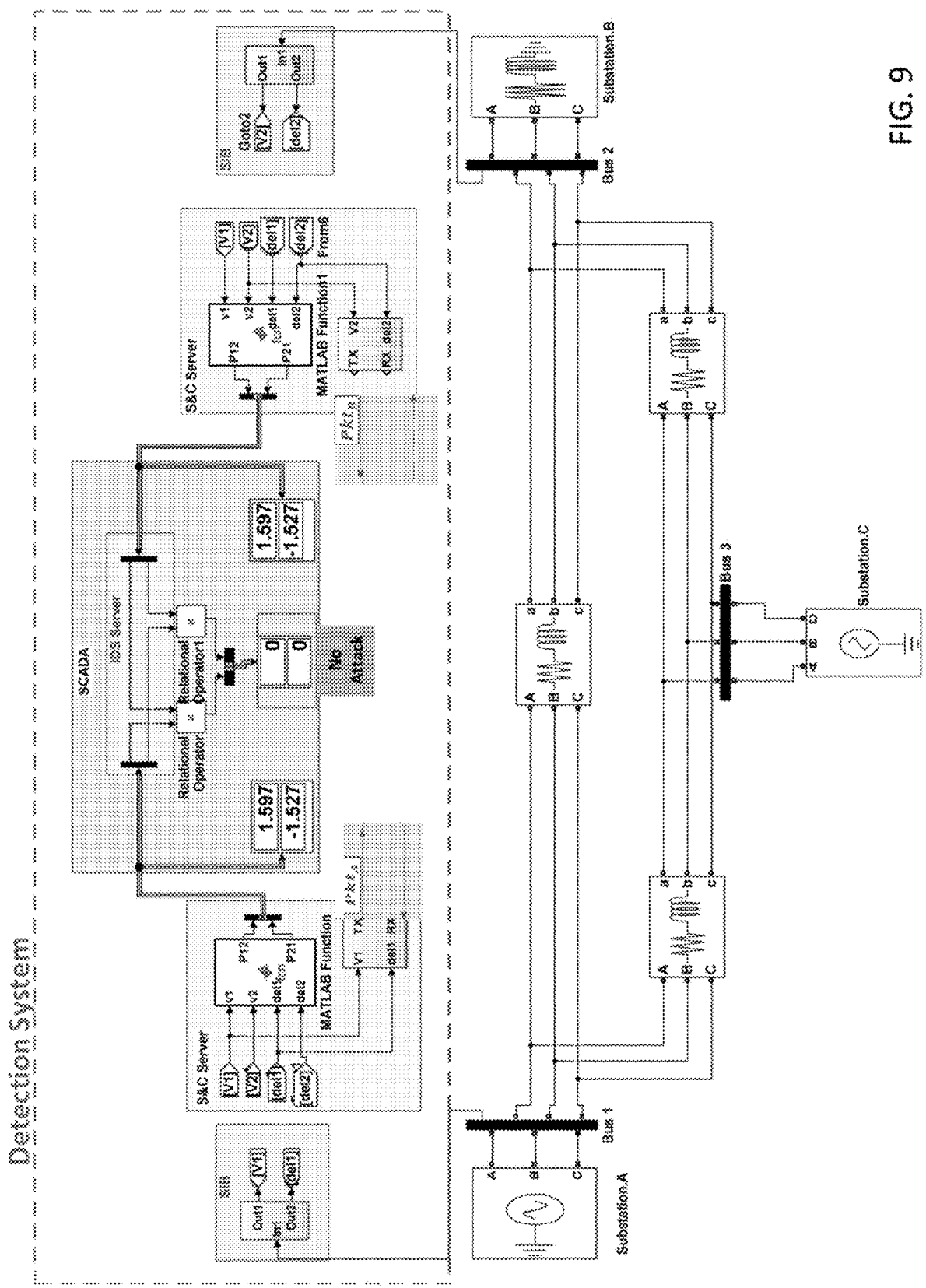
FIG. 9 shows schematically Scenario 0: no attack case, according to one embodiment of the invention.

Scenario 0:

In this scenario, the system operates normally without launching or activating any attack. As mentioned earlier, the IDS server in SCADA expects that both substations (A and B) report the same power flow data as shown in FIG. 9. The IDS Server in SCADA shows a value of 0 as an indication that neither of the substations is compromised.

Figure 10:
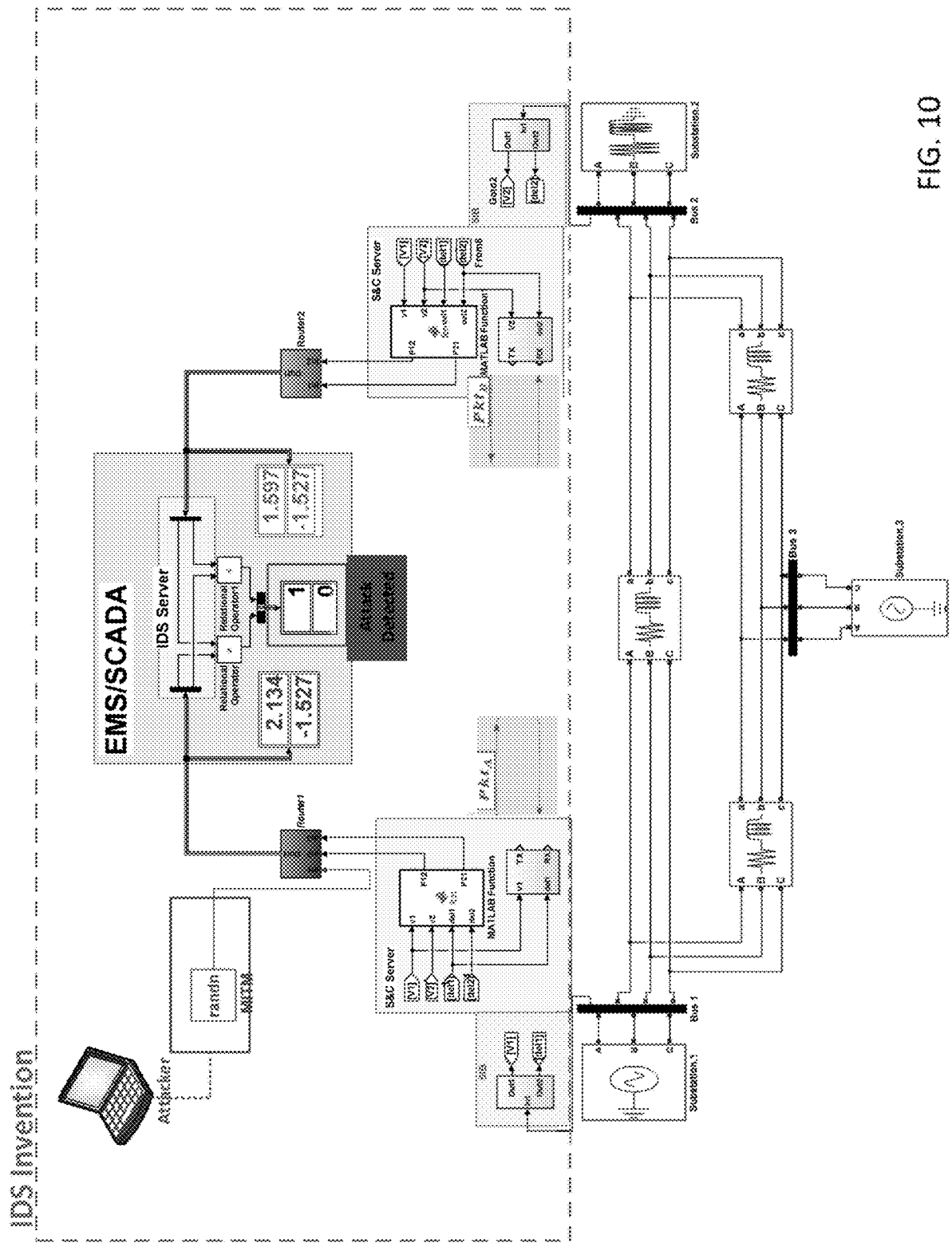
FIG. 10 shows schematically Scenario 1: detecting the MITM attack on Substation A, according to one embodiment of the invention.

Scenario 1:

In this scenario, a MITM attacker is launched to falsify the power flow data that Substation A reports to the EMS (SCADA) as shown in FIG. 10. The IDS server detects the attack because the reported power flow from Substation A (Bus 1) is different from the values reported by Substation B (Bus 2)

Figure 11:
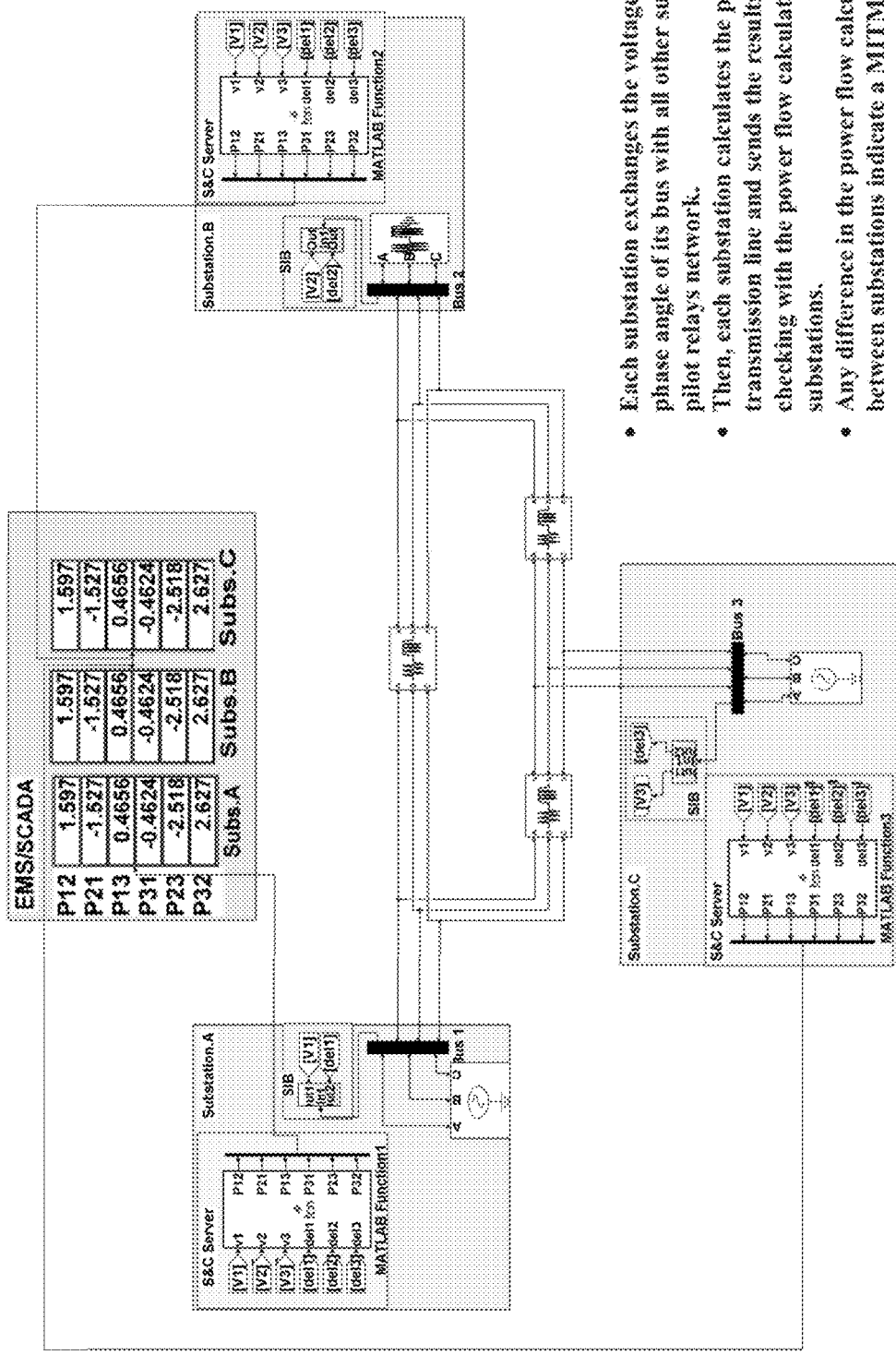
FIG. 11 shows schematically how to use the detection system for more than two substations, according to one embodiment of the invention.

Scenario 2:

In this scenario, three substations where each substation exchanges the voltage magnitude and phase angle of its bus with all other substations through the teleprotection links between substations. As shown in FIG. 11, Substations A, B and C exchange the data of the voltage magnitude and phase angle of each other to calculate the power flow. If there are more than three substations and some of them are not directly connected, each substation can use its directly connected one to forward the data to the indirectly connected substations. Then, each substation calculates the power flow of the transmission lines and sends the results to SCADA for cross-checking with other substations. Any difference in the power flow calculation results between substations indicates a MITM attack as shown in FIG. 12.

Figure 12:
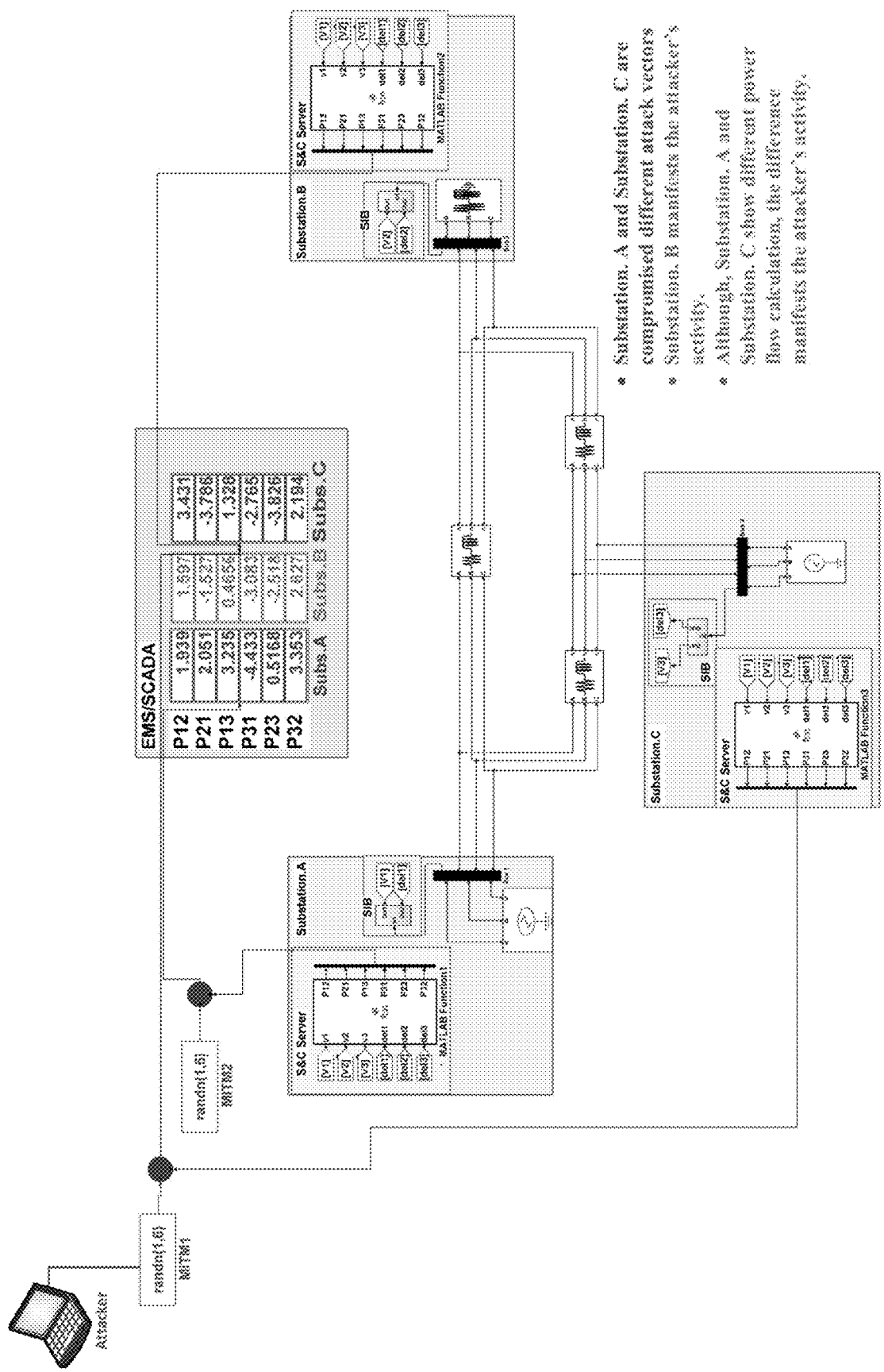
FIG. 12 shows schematically Scenario 2: detection of a MITM attack using random attack vector against Substations A and C, according to one embodiment of the invention.

In this scenario, the MITM attacker injects "random" attack vectors against Substation A and Substation C as shown in FIG. 12. Substation B manifests the attacker's activity. Moreover, the difference in power flow of Substation A and Substation C manifests the attacker's activity as well.

Figure 13:
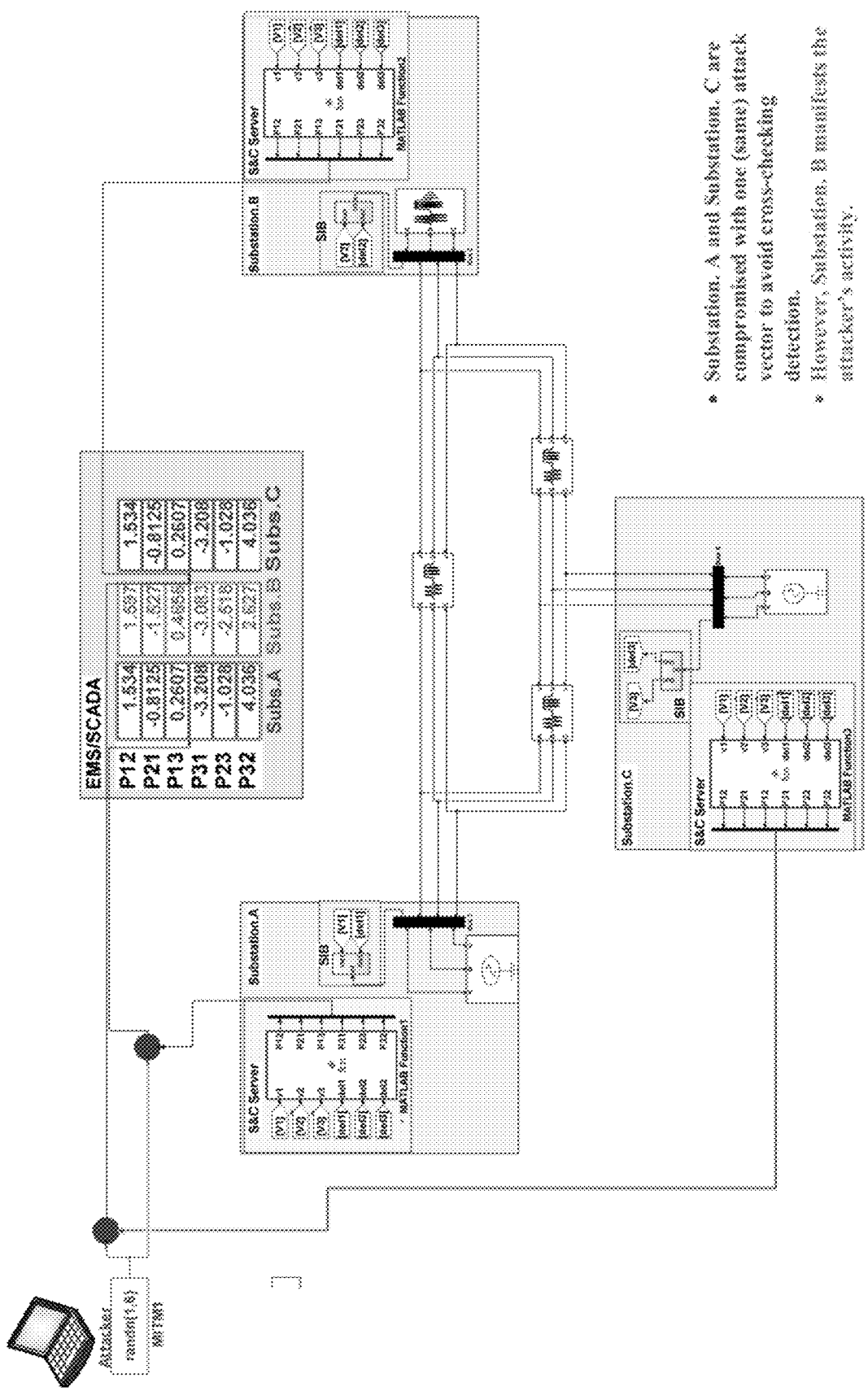
FIG. 13 shows schematically Scenario 3: detection of a MITM attack using same attack vector against Substations A and C, according to one embodiment of the invention.

Scenario 3:

In this scenario, the MITM attacker injects the same (instead of random) attack vectors against Substation A and Substation C to avoid cross-checking detection. However, Substation B manifests the attacker's activity as shown in FIG. 13.

Attack Detection Examples

The above-disclosed attack scenarios are injection of false data of power flow values. The following scenarios can be used by the attacker to try to construct undetectable attack vectors. However, they are still detectable using the same detection system with some modifications.

Example 1: Using Same Attack Vectors of the Power Flow Values

Assuming the attacker compromises all the substations at the same time and constructs the same attack vectors of power flow values on each substation to prevent cross-checking in the IDS server. In this case, the IDS server will not detect any discrepancy between the substations reported power flow values.

In certain embodiments, little modification needs to be added to the IDS server to detect such an attack. The IDS server can do the following to prevent such attack: comparing the power flow with the injected power at each bus, where the input power should be equal to the output power at each bus. Moreover, the power flow equation is a function of a number of parameters given in the following two equations.

The parameters are transmission line impedance, and the voltage magnitude and phase angle at each bus. Therefore, when the attacker changes the power flow values without changing the aforementioned parameters, the IDS server can detect it as follows: using the following two equations to recalculate the true power flow using the true parameters; comparing the true with the fake power flow value of each substation; and issuing an intrusion alarm in case of any discrepancy between the power flow values.

Example 2: Using Same Attack Vectors of Power Flow Values and Crafting the Related Parameters The attacker can inject the same attack in Example 1, and change all the associated parameters/variables to prevent the IDS server from recalculating the power flow and compare it with the false power flow values. However, in order to do that, the attacker should know the impedance of the transmission lines and the CBs status. The attacker cannot get complete knowledge about the grid topology because it is usually a non-disclosed data.

Example 3: Replay Attack Detection

If the MITM attacker records OT data of one or two substations and injects them later (replay attack), the detection system still be able to detect such attack by following the same detection procedure mentioned earlier—cross-checking the fake OT data with another OT data of uncompromised substation in the system.

State estimation servers in SCADA can reject bad data using bad data detectors (BDD) that are based on hypothesis tests such as Chi-square distribution tests. However, studies have shown a MITM attack can fool theses BDD(s) if the attacker launched replay attacks.

Alternative Approaches

In certain embodiments, Components 1-4 can be changed to achieve the same outcome as follows:

Devices:

(1) Remote terminal unit such as RTU or SEL-RTAC can be used to exchange the data through a secure communication link between substations or the teleprotection communication link to calculate the power flow. (2) Pilot relays or other protection relays or intelligence electronic devices such as SEL-411L can be configured to send and exchange the OT data between substations.

Data Types:

(1) In one embodiment, the phase angle, voltage magnitude is exchanged between substations through the telecommunication links. In certain embodiments, the invention can be modified to exchange other data or random numbers for authentication purposes. For example, Substation A can send a random number to SCADA through the direct communication links and also through the adjacent substations (B/C). The IDS can compare the random keys and make a decision if a MITM compromised either of the communication links. (2) The power flow equation can be modified to be any equation such as the reactive power flow to be used for cross-checking. (3) In another embodiment, synchrophasor technology could be used for cross-checking with other measurements.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described to explain the principles of the invention and their practical application to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. A system for detecting a man-in-the-middle attack (MITM) for supervisory control and data acquisition (SCADA) communication networks, comprising:

at least one secure substation-substation communication link for providing a secure and reliable path to exchange operational information (OT) data between substations for consistency checking of the OT data in SCADA;

at least one substation intelligent box (SIB) placed inside each substation and coupled to a main substation bus for sampling current transformer (CT) and potential transformer (PT) measurements to calculate voltage magnitude (V) and phase angle ($\delta$) thereof;

at least one send and capture (S&C) server placed inside each substation and coupled through communication means to the SIB for receiving the voltage magnitude and phase angle from the SIB and obtaining a packet that carries active power flow in transmission lines between two substations and a time stamp, based on an output from the SIB for each substation; and at least one intrusion detection system (IDS) server placed in a SCADA center for collecting the packet of each substation sent by the S&C server; analyzing the received packet from every adjacent substation; inspecting the payload of the received packet; and triggering an intrusion alarm to a SCADA operator when the payload of the packets indicates the power flow is not the same.

2. The system of claim 1, wherein the at least one secure substation-substation communication link is one or more teleprotection communication links.

3. The system of claim 1, wherein the at least one SIB comprises at least one processor operably coupled to a scaled level of the CT and the PT of the main substation bus, and configured to sample the CT and PT measurements to calculate the voltage magnitude (V) and phase angle ($\delta$).

4. The system of claim 1, wherein each SIB inside a substation is in synch with the other SIB placed inside its adjacent substation.

5. The system of claim 1, wherein the communication means comprises a serial communication network, or other communication networks.

6. The system of claim 1, wherein the at least one S&C server at each substation (substation A) is configured to perform the following functions:

(a) tagging the calculated voltage magnitude ($V_A$) and phase angle ($\delta_A$) at substation A with a timestamp $t_A$;

(b) creating a packet $Pkt_A$ that carries the value of $V_A$, $\delta_A$ and $t_A$;

(c) sending the packet $Pkt_A$ to the at least one C&S server installed in its adjacent substation, substation B;

(d) receiving and capturing a packet $Pkt_B$, which is a packet transmitted from the at least one C&S server installed in substation B;

(e) calculating the active power flow ($P_{AB}$) between substation A and substation B using the following two equations, $$P_{AB} = \frac{|V_A|^2}{|Z_{AB}|} \cos(\phi_{Z_{AB}}) - \frac{|V_A||V_B|}{|Z_{AB}|} \cos(\phi_{Z_{AB}} + \delta_A - \delta_B) \quad (1)$$

$$P_{BA} = \frac{|V_B|^2}{|Z_{AB}|} \cos(\phi_{Z_{AB}}) - \frac{|V_A||V_B|}{|Z_{AB}|} \cos(\phi_{Z_{AB}} + \delta_B - \delta_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $S_A$ and $S_B$ are the phase angle at bus A and B, respectively; and $|Z_{AB}|$ and $\varnothing_{Z_{AB}}$ are the magnitude and phase angle of the transmission line impedance between bus A and B;

(f) tagging the calculated $P_{AB}$ and $P_{BA}$ with a timestamp $t_A$;

(g) creating a packet Pkt_SubA that carries $N_{AB}$, or $N_{BA}$, or other variables if more data integrity verifications are needed, and $t_A$; and (h) sending the packet Pkt_SubA to the at least one IDS server, wherein the at least one C&S server installed in the adjacent substation (substation B) of said each substation (substation A) is configured to perform the same steps (a)-(h), and send the packet $Pkt_B$ to the at least one C&S server installed substation A, and the packet Pkt_SubB packet to the at least one IDS server.

7. The system of claim 6, wherein the at least one IDS server is either physical or virtual server placed in the SCADA center that is on the same SCADA network of substations.

8. The system of claim 7, wherein the at least one IDS server is configured to perform the following functions to detect an intrusion:

(a) collecting all the sent packets by substations;

(b) analyzing the received packet Pkt_SubA and Pkt_SubB from every adjacent substation;

(c) inspecting the payload of the received packets Pkt_SubA and Pkt_SubB; and (d) when the payload of the packets Pkt_SubA and Pkt_SubB indicates the power flow $P_{AB}$ in both the packets is not the same, the at least one IDS server triggers an intrusion alarm to a SCADA operator.

9. A method for detecting a man-in-the-middle attack (MITM) for supervisory control and data acquisition (SCADA) communication networks, comprising:

providing a secure and reliable path to exchange operational information (OT) data between substations for consistency checking of OT data in SCADA;

sampling current transformer (CT) and potential transformer (PT) measurements to calculate voltage magnitude (V) and phase angle ($S$) of each substation, by at least one substation intelligent box (SIB) placed inside each substation and coupled to a main substation bus;

receiving the calculated voltage magnitude and phase angle of each substation; and obtaining a packet that carries the active/reactive power flow between two adjacent substations and a timestamp, based on the received voltage magnitude and phase angle for each substation, by at least one send and capture (S&C) server placed inside each substation and coupled through communication means to the SIB; and collecting the packet of each substation; analyzing the received packet from every adjacent substation; inspecting the payload of the received packet; and triggering an intrusion alarm to a SCADA operator when the payload of the packets indicates the power flow is not the same, by at least one intrusion detection system (IDS) server placed in a SCADA center.

10. The method of claim 9, wherein the secure and reliable path comprises at least one secure substation-substation communication link including one or more teleprotection communication links.

11. The method of claim 9, wherein the at least one SIB comprises at least one processor operably coupled to a scaled level of the CT and the PT of the main substation bus.

12. The method of claim 11, wherein each SIB inside a substation is in synch with the other SIB placed inside its adjacent substation.

13. The method of claim 9, wherein the receiving and obtaining step comprises:

(a) tagging the calculated voltage magnitude ($V_A$) and phase angle ($S_A$) at substation A with a timestamp $t_A$;

(b) creating a packet $Pkt_A$ that carries the value of $V_A$, $S_A$ and $t_A$;

(c) sending the packet $Pkt_A$ to the at least one C&S server installed in its adjacent substation, substation B;

(d) receiving and capturing a packet $Pkt_B$, which is a packet transmitted from the at least one C&S server installed in substation B;

(e) calculating the active power flow ($P_{AB}$) between substation A and substation B using the following two equations, $$P_{AB} = \frac{|V_A|^2}{|Z_{AB}|}\cos(\varnothing_{Z_{AB}}) - \frac{|V_A||V_B|}{|Z_{AB}|}\cos(\varnothing_{Z_{AB}} + S_A - S_B) \quad (1)$$

$$P_{BA} = \frac{|V_B|^2}{|Z_{AB}|}\cos(\varnothing_{Z_{AB}}) - \frac{|V_A||V_B|}{|Z_{AB}|}\cos(\varnothing_{Z_{AB}} + S_B - S_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $S_A$ and $S_B$ are the phase angle at bus A and B, respectively; and $|Z_{AB}|$ and $\varnothing_{Z_{AB}}$ are the magnitude and phase angle of the transmission line impedance between bus A and B;

(f) tagging the calculated $P_{AB}$ and $P_{BA}$ with a timestamp $t_A$;

(g) creating a packet Pkt_SubA that carries $P_{AB}$, or $N_{BA}$, or other variables if more data integrity verifications are needed, and $t_A$; and (h) sending the packet Pkt_SubA to the at least one IDS server, wherein the same steps (a)-(h) are performed at an adjacent substation B of substation A by the at least one C&S server installed substation B, and sending the packet $Pkt_B$ to the at least one C&S server installed substation A, and the packet Pkt_SubB packet to the at least one IDS server.

14. The s method of claim 9, wherein the at least one IDS server is either a physical or virtual server placed in the SCADA center that is on the same SCADA network of substations.

15. The method of claim 9, wherein the collecting, analyzing, inspecting and triggering step comprises (a) collecting all the sent packets by substations;

(b) analyzing the received packet Pkt_SubA and Pkt_SubB from every adjacent substation;

(c) inspecting the payload of the received packets Pkt_SubA and Pkt_SubB; and (d) when the payload of the packets Pkt_SubA and Pkt_SubB indicates the power flow $P_{AB}$ in both the packets is not the same, the at least one IDS server triggers an intrusion alarm to a SCADA operator.

16. A non-transitory computer-readable medium storing programs or codes which, when executed by one or more processors, cause a system to perform the method for detecting a man-in-the-middle attack (MITM) for supervisory control and data acquisition (SCADA) communication networks, the method comprising:
  providing a secure and reliable path to exchange operational information (OT) data between substations for consistency checking of OT data in SCADA;
  sampling current transformer (CT) and potential transformer (PT) measurements to calculate voltage magnitude (V) and phase angle ($\mathcal{S}$) of each substation;
  receiving the calculated voltage magnitude and phase angle of each substation; and obtaining a packet that carries the active/reactive power flow between two adjacent substations and a timestamp, based on the received voltage magnitude and phase angle for each substation; and
  collecting the packet of each substation; analyzing the received packet from every adjacent substation; inspecting the payload of the received packet; and triggering an intrusion alarm to a SCADA operator when the payload of the packets indicates the power flow is not the same.

17. The non-transitory computer-readable medium of claim 16, wherein the receiving and obtaining step comprises:
  (a) tagging the calculated voltage magnitude ($V_A$) and phase angle ($\mathcal{S}_A$) at substation A with a timestamp $t_A$;
  (b) creating a packet $Pkt_A$ that carries the value of $V_A$, $\mathcal{S}_A$ and $t_A$;
  (c) sending the packet $Pkt_A$ to the at least one C&S server installed in its adjacent substation, substation B;
  (d) receiving and capturing a packet $Pkt_B$, which is a packet transmitted from the at least one C&S server installed in substation B;
  (e) calculating the active power flow ($P_{AB}$) between substation A and substation B using the following two equations, $$P_{AB} = \frac{|V_A|^2}{|Z_{AB}|} \cos(\emptyset_{Z_{AB}}) - \frac{|V_A||V_B|}{|Z_{AB}|} \cos(\emptyset_{Z_{AB}} + \mathcal{S}_A - \mathcal{S}_B) \quad (1)$$

$$P_{BA} = \frac{|V_B|^2}{|Z_{AB}|} \cos(\emptyset_{Z_{AB}}) - \frac{|V_A||V_B|}{|Z_{AB}|} \cos(\emptyset_{Z_{AB}} + \mathcal{S}_B - \mathcal{S}_A) \quad (2)$$

wherein $P_{AB}$ is the active power flow in the transmission line from bus A and B; $P_{BA}$ is the active power flow in the transmission line from bus B and A; $V_A$ and $V_B$ are the voltage magnitude at bus A and B, respectively; $\mathcal{S}_A$ and $\mathcal{S}_B$ are the phase angle at bus A and B, respectively; and $|Z_{AB}|$ and $\emptyset_{Z_{AB}}$ are the magnitude and phase angle of the transmission line impedance between bus A and B;

(f) tagging the calculated $P_{AB}$ and $P_{BA}$ with a timestamp $t_A$;
  (g) creating a packet Pkt_SubA that carries $N_{AB}$, or $N_{BA}$, or other variables if more data integrity verifications are needed, and $t_A$; and
  (h) sending the packet Pkt_SubA to the at least one IDS server,
  wherein the same steps (a)-(h) are performed at an adjacent substation B of substation A by the at least one C&S server installed substation B, and sending the packet $Pkt_B$ to the at least one C&S server installed substation A, and the packet Pkt_SubB packet to the at least one IDS server.

18. The non-transitory computer-readable medium of claim 16, wherein the collecting, analyzing, inspecting and triggering step comprises
  (a) collecting all the sent packets by substations;
  (b) analyzing the received packet Pkt_SubA and Pkt_SubB from every adjacent substation;
  (c) inspecting the payload of the received packets Pkt_SubA and Pkt_SubB; and
  (d) when the payload of the packets Pkt_SubA and Pkt_SubB indicates the power flow $P_{AB}$ in both the packets is not the same, the at least one IDS server triggers an intrusion alarm to a SCADA operator.

* * * * *